United States Patent [19]

Neal

[11] Patent Number: 4,657,482
[45] Date of Patent: Apr. 14, 1987

[54] AIR COOLING SYSTEMS FOR GAS TURBINE ENGINES

[75] Inventor: Peter F. Neal, Derby, England

[73] Assignee: Rolls-Royce plc, London, England

[21] Appl. No.: 308,188

[22] Filed: Sep. 18, 1981

[30] Foreign Application Priority Data

Oct. 10, 1980 [GB] United Kingdom ............... 8032873

[51] Int. Cl.⁴ .................................. F01D 25/08
[52] U.S. Cl. ................................ 415/176; 415/116; 60/39.07; 60/39.83
[58] Field of Search .............. 415/115, 116, 117, 176, 415/180; 416/95, 97 A, 231 R; 60/39.07, 753, 754, 755, 39.83; 244/35 R, 130

[56] References Cited

U.S. PATENT DOCUMENTS

| | | | |
|---|---|---|---|
| 2,973,937 | 3/1958 | Wolf | 415/115 |
| 3,365,172 | 1/1968 | McDonough et al. | 415/117 |
| 3,557,553 | 1/1971 | Schmitz | 60/754 |
| 3,700,418 | 10/1972 | Mayeda | 416/231 |
| 3,893,786 | 7/1975 | Rahnke et al. | 415/116 |
| 4,013,376 | 3/1977 | Bisson et al. | 415/117 |
| 4,022,542 | 5/1977 | Barbeau | 416/231 R |
| 4,126,405 | 11/1978 | Bobo et al. | 416/97 A |
| 4,151,674 | 5/1979 | Klahn et al. | 102/503 |
| 4,168,348 | 9/1979 | Bhangu et al. | 60/754 |
| 4,273,824 | 6/1981 | McComas et al. | 60/753 |
| 4,291,531 | 9/1981 | Campbell | 60/39.75 |
| 4,434,957 | 3/1984 | Moritz | 416/223 R |

FOREIGN PATENT DOCUMENTS

| | | |
|---|---|---|
| 955159 | 11/1947 | France . |
| 2030993 | 11/1970 | France . |
| 609028 | 10/1941 | United Kingdom . |
| 621300 | 2/1946 | United Kingdom . |
| 1157930 | 11/1967 | United Kingdom . |
| 1270959 | 9/1968 | United Kingdom . |
| 1217807 | 12/1970 | United Kingdom . |
| 1387638 | 3/1975 | United Kingdom . |
| 2054046 | 7/1979 | United Kingdom ............... 416/95 |

OTHER PUBLICATIONS

Esgar et al; *Review of Status, Methods and Potentials of Gas Turbine Air Cooling*, Research Publication NACA (1955).

Primary Examiner—Stephen C. Bentley
Attorney, Agent, or Firm—Parkhurst & Oliff

[57] ABSTRACT

A gas turbine engine in which a rotating component (such as a turbine shaft or disc) is cooled by directing preswirled air at it by flowing the air along a passageway defined by the rotating component and a static wall. To reduce the viscous drag on the swirling air due to the presence of the static wall, the static wall is transpired to cause the boundary layer of air adjacent the wall to move in the same direction as the swirling air. The wall may be transpired by sucking or blowing air through air passages through the wall.

3 Claims, 4 Drawing Figures

AIR COOLING SYSTEMS FOR GAS TURBINE ENGINES

BACKGROUND OF THE INVENTION

This invention relates to air cooling systems for gas turbine engines.

It is customary to bleed compressed air from one or more of the compressors of a gas turbine engine to provide cooling of various static and rotating components.

If air is used to cool high speed rotating components the friction caused by the air on the rotating components can give rise to appreciable heating of the air. This form of heating of the air is often referred to as "windage heating". It is known from British Pat. No. 1,217,807 that "windage heating" may be reduced by preswirling the air in the same direction as the rotating components. Ideally the volume of swirling air has a swirl velocity the same as the angular velocity of the rotating components.

In many designs of gas turbine engine the swirling air is caused to flow through narrow passages defined by a static structure and the rotating component to prevent or reduce recirculation of the cooling air to regions of the engine where it would be preferable not to flow the cooling air.

There are many advantages in being able to keep the cooling air as cool as possible and to avoid windage heating. For example, one can achieve lower temperature environments thus enabling present materials to be used with a greater safety margin or to enable cheaper materials to be used.

However, it has been found that the viscous drag of the swirling air on static structures and walls can slow the swirling air to such an extent that the swirl velocity is at variance with the angular velocity of the rotating components and gives rise to windage heating of the air.

SUMMARY OF THE INVENTION

An object of this invention is to reduce the windage heating of the pre-swirled air by reducing the viscous drag on static components.

According to the present invention there is provided a gas turbine engine having means for tapping pressurised air from the main air flow of the engine, means for preswirling the air in the same direction as the direction of rotation of a rotating component and for directing the pre-swirled air at the component thereby to cool it, a passageway defined by the component and a static wall positioned adjacent the component and through which passageway the pre-swirled air flows, further characterised in that the static wall is provided with air passages therethrough and means are provided to energise the boundary layer of the pre-swirled air adjacent the wall to cause the boundary layer to move relative to the wall in the same direction as the direction of swirl.

The means for inducing the air to flow through the passages may comprise an air supply means for supplying pressurised air, at a higher pressure than the pressure of the pre-swirled air, to a side of the wall remote from the pre-swirled air thereby to cause air to flow through the passages into the pre-swirled air.

Alternatively the means for inducing the air to flow through the passages may comprise means for establishing a region of lower pressure than the pressure of the pre-swirled air on a side of the wall remote from the pre-swirled air thereby to cause some of the pre-swirled air to flow through the passages to the region of lower pressure.

The wall may comprise an air permeable material made of metal or ceramic, a perforated or foraminated sheet material, or a woven or braided metal or ceramic gauze.

The invention will now be described by way of an example with reference to the accompanying drawing in which;

DETAILED DESCRIPTION OF PREFERRED EMBODIMENTS

Figure 1:
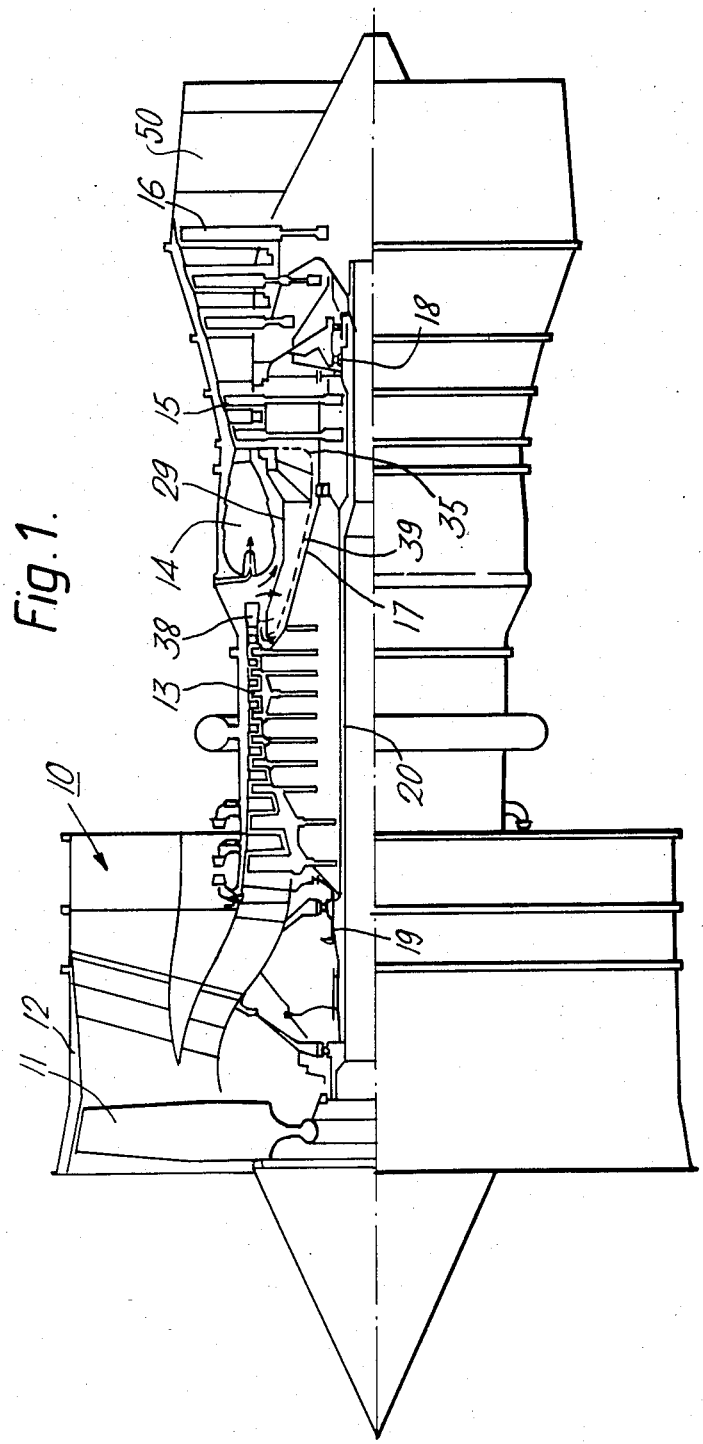
FIG. 1 illustrates a gas turbine engine constructed in accordance with the present invention.
Figure 2:
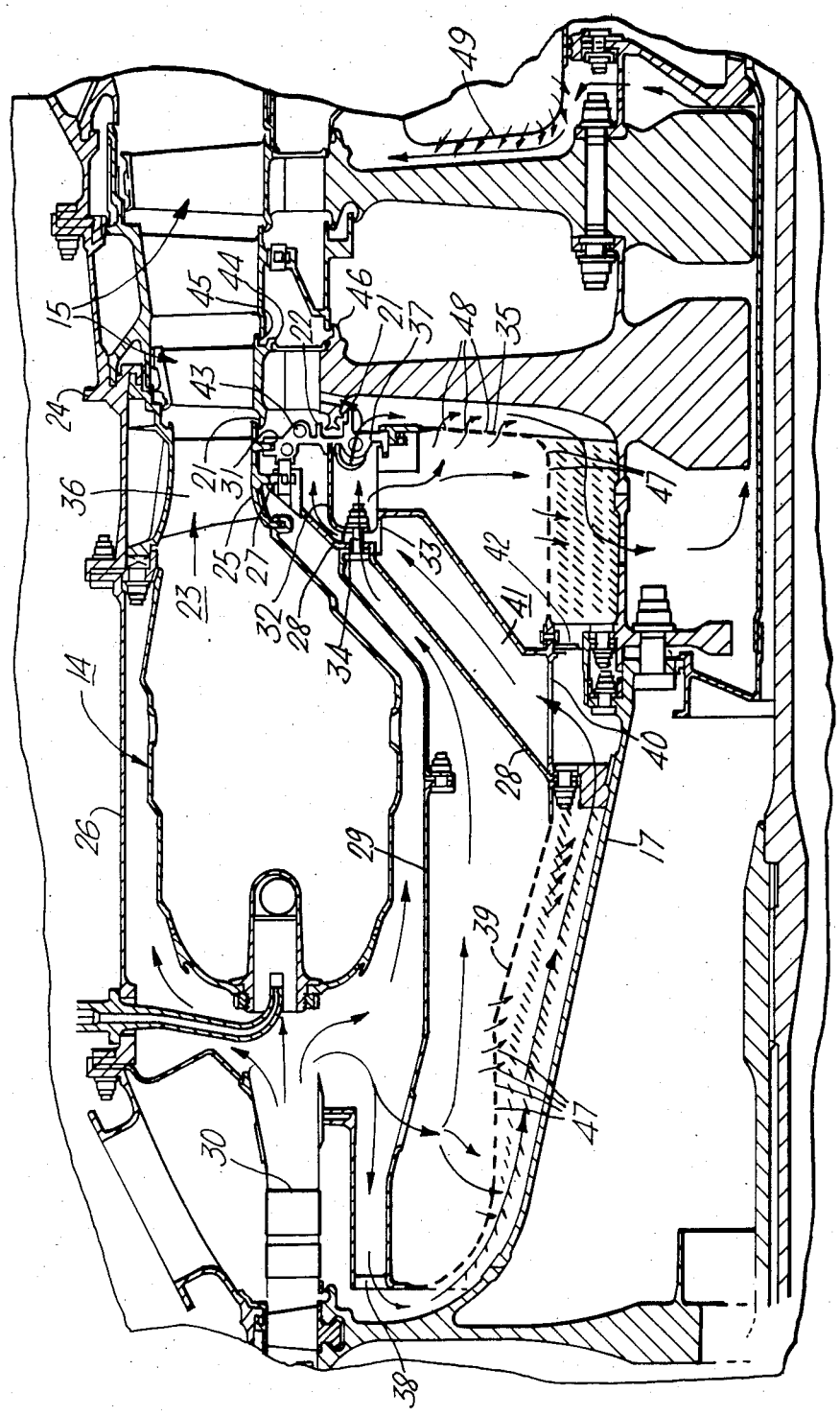
FIG. 2 illustrates in greater detail part of the engine of FIG. 1 showing a part of the air cooling system for cooling a shaft of the engine.

Referring to the drawings there is shown a gas turbine aero engine 10 comprising a low pressure single stage compressor fan 11 mounted in a by-pass duct 12 and a core engine which comprises, in flow series, a multi stage high pressure axial flow compressor 13, a combustion chamber 14, a two stage high pressure turbine 15, a multi-stage low pressure turbine 16 and a jet pipe 50.

The HP turbine 15 is connected to the HP compressor 13 by means of a shaft 17. The shaft 17 is supported at its rear end in a journal bearing 18 and the front end of the compressor 13 is mounted in a thrust bearing 19. The LP shaft 20 connecting the LP turbine 16 to the LP fan 11 passes through the bore of the HP shaft 17.

The first stage disc of the HP turbine 15 has members 21 on its upstream side which co-operate with surfaces on an adjacent seal plate 22 to define air seals. The seal plate 22 is carried by a segmented inlet guide vane assembly 23 mounted in the turbine outer casing. The inner platform 25 of the guide vane assembly 23 supports the inner wall of an annular combustion chamber 14 (the outer wall of the combustion chamber 14 is carried by the combustion chamber outer casing 26). The inner platform 25 has two flanges projecting radially inwards. One flange 27 has attached to it a static wall structure 28 that serves to define a number of separate flow passageways through which cooling air can flow.

Bolted to the wall structure 28 is the combustion chamber inner casing 29. This casing encompasses the inner regions of the combustion chamber 14 and is supported at its upstream end by the outlet nozzle guide vane and diffuser assembly 30 of the HP compressor 13.

The outer circumference of the seal plate 22 is provided with a recess into which the flange 31 on the inner platform 25 of the guide vane assembly 23 locates. The seal plate 22 has two recesses into each of which a thin wall webs 32,33 locates. The web 32,33 project forward from the plane of the plate 22 and are bolted to the wall structure 28 by the nuts and bolts 34. A cover plate 35 covers the upstream face of the first stage disc of the HP turbine.

Some of the high pressure air supplied to the combustion chamber 14 is tapped from the downstream end of the HP compressor 13 and ducted along four separate flow paths. One flow path is around the outside of the outer wall of the combustion chamber 14 to issue through cooling holes in the leading edge of the guide vanes 36. A second flow path is around the outside of the inner wall of the combustion chamber 14 to issue from holes in the trailing edge of the vanes 36.

The third flow is ducted between walls 28,29,32 and 33 to issue through nozzles 37 in the seal plate 22 and thereby cool the turbine blades in a similar manner to that described in U.S. Pat. No. 4,275,990, and is also used to cool the front face of the first stage disc of the HP turbine 15.

The fourth flow is pre swirled by pre swirl nozzles 38 in the same direction as the direction of rotation of the compressor rotor 13. The swirling air flows between a static wall 39, which is bolted to the wall structure 28 and secured to the pre swirl nozzles 38, and the rotating shaft 17 to cool the shaft 17. As the cooling air flows radially inwards it increases its velocity and its static pressure decreases. The air is then bled through large holes 40 into a diffusing passage 41 constituted by two spaced conical walls, which define an annular diffuser with a radially inward facing inlet and a radially outward facing outlet. A brush seal prevents the fourth flow of air by-passing the diffuser 41. The air discharged from the diffuser 41 passes through radial holes in the flange of web 33 between the bolts 34 and is discharged through nozzles 43 in seal plate 22, at a region between the air seals. Some of the air flows through passages in the rim of the first stage disc of the HP turbine 15 between the blade roots and issues from nozzles 44 at the downstream face of the first disc, and some is used to help cool the HP turbine blades. The air is then used to pressurise the disc rim seals 45 and 46.

In accordance with the present invention both the static wall 39 and the cover plate 35 are provided with openings 47,48 aligned to point in the same direction as the direction of swirl of the air flowing between the shaft 17 and the wall 39 (or between the first stage disc of the HP turbine 15 and the cover plate 35 as the case may be). Pressurised air on the side of the wall 39 (or the cover plate 35 as the case may be) remote from the swirling air flows through the openings 47 or 48 and energises the boundary layer adjacent the wall 39 (or cover plate 35) causing it to move in the same direction as the direction of swirl, thus reducing the viscous drag on the swirling air.

Figure 3:
FIG. 3 illustrates a configuration of the static wall of the engine of FIG. 1.
Figure 4:
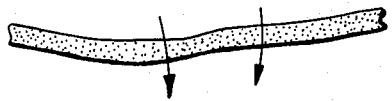
FIG. 4 illustrates an alternate configuration of the static wall of the engine of FIG. 1.

The wall 39, or cover plate 35 may be pre-drilled with holes or slots defining the openings 47,48 or may be made from perforated, or foraminated metal sheets. Alternatively the wall 39 or cover plate 35 may include air permeable panels (for example woven metal gauzes, or braiding or ceramic materials, as shown in FIGS. 3 and 4).

The present invention may be employed elsewhere in the engine, for example, the static structure 49 adjacent the rear of the second stage HP turbine disc may be made air permeable and supplied on the side remote from the turbine disc with pressurised air.

A similar effect to blowing air through static walls can be achieved in some applications by effectively reducing the pressure on the side of the wall remote from the swirling air to induce some of the swirling air to flow through openings in the wall thereby to induce flow of the boundary layer in the same direction as the direction of swirl. This could be achieved for example in arranging that the side of the wall to be transpired is subjected to a cooling air flow of lower static pressure than the pressure of the swirling air.

In the above embodiment of the invention it is preferred to shape the openings 47,48 to direct the air flowing through them preferentially in the same direction as the direction of swirl. This may be achieved by punching the openings 47,48 to form shrouds or recesses that induce the air to flow in the desired direction. It is to be understood however, that it may not be essential to direct the air in this way. It may be sufficient to allow the air to flow or permeate through the wall in a direction which is generally normal to the wall and thereby effectively air-lubricate the wall to allow the boundary layer of air adjacent the wall to move in the same direction as the swirling air assisted by the air flow through the wall. This would be the case with air permeable panels such as those mentioned above.

I claim:

1. In a gas turbine engine having a rotating component and a static wall positioned adjacent said rotating component to define a passageway, said engine having a main air flow, means for tapping pressurized air from said main air flow, means for preswirling said tapped air in the same direction as the direction of rotation of said rotating component, and means for directing the preswirled air onto said rotating component through said passageway, the improvement comprising:
a plurality of passages through said static wall, said static wall comprising a perforated or foraminated sheet and having a boundary layer of the preswirled tapped air adjacent thereto; and
supplemental air supply means for supplying pressurized air at a higher pressure than the pressure of the preswirled tapped air to a side of the wall remote from the preswirled tapped air, thereby to induce supplemental air to flow through the passages into the preswirled tapped air such that said induced supplemental air flow causes said boundary layer to move relative to said static wall in the same direction as the direction of swirl, whereby the air flow through said passages reduces windage heating of the preswirled tapped air by reducing viscous drag on the static wall.

2. In a gas turbine engine having a rotating component and a static wall positioned adjacent said rotating component to define a passageway, said engine having a main air flow, means for tapping pressurized air from said main air flow, means for preswirling said tapped air in the same direction as the direction of rotation of said rotating component, and means for directing the preswirled air onto said rotating component through said passageway, the improvement comprising:
a plurality of passages through said static wall, said static wall comprising a woven or braided gauze and having a boundary layer of the preswirled tapped air adjacent thereto; and
supplemental air supply means for supplying pressurized air at a higher pressure than the pressure of the preswirled tapped air to a side of the wall remote from the preswirled tapped air, thereby to induce supplemental air to flow through the passages into the preswirled tapped air such that said induced supplemental air flow causes said boundary layer to move relative to said static wall in the same direction as the direction of swirl, whereby the air flow through said passages reduces windage heating of the preswirled tapped air by reducing viscous drag on the static wall.

3. In a gas turbine engine having a rotating component and a static wall positioned adjacent said rotating component to define a passageway, said engine having a main air flow, means for tapping pressurized air from said main air flow, means for preswirling said tapped air in the same direction as the direction of rotation of said rotating component, and means for directing the preswirled air onto said rotating component through said passageway, the improvement comprising:
- a plurality of passages through said static wall, said static wall comprising a ceramic material having a boundary layer of the preswirled tapped air adjacent thereto; and
- supplemental air supply means for supplying pressurized air at a higher pressure than the pressure of the preswirled tapped air to a side of the wall remote from the preswirled tapped air, thereby to induce supplemental air to flow through the passages into the preswirled tapped air such that said induced supplemental air flow causes said boundary layer to move relative to said static wall in the same direction as the direction of swirl, whereby the air flow through said passages reduces windage heating of the preswirled tapped air by reducing viscous drag on the static wall.

* * * * *